United States Patent
Chen (10) Patent No.: US 12,513,726 B2
(45) Date of Patent: Dec. 30, 2025

(54) METHOD, SYSTEM, AND DEVICE FOR PROCESSING RESOURCE ALLOCATION IN V2X COMMUNICATION, AND MEDIUM

(71) Applicant: SPREADTRUM COMMUNICATIONS (SHANGHAI) CO., LTD., Shanghai (CN)

(72) Inventor: Mimi Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 707 days.

(21) Appl. No.: 17/799,801

(22) PCT Filed: Feb. 5, 2021

(86) PCT No.: PCT/CN2021/075651
§ 371 (c)(1),
(2) Date: Aug. 15, 2022

(87) PCT Pub. No.: WO2021/164589
PCT Pub. Date: Aug. 26, 2021

(65) Prior Publication Data
US 2023/0092944 A1    Mar. 23, 2023

(30) Foreign Application Priority Data
Feb. 18, 2020 (CN) .......................... 202010098781.8

(51) Int. Cl.
*H04W 72/541* (2023.01)
*H04W 72/20* (2023.01)
*H04W 72/56* (2023.01)

(52) U.S. Cl.
CPC ......... *H04W 72/541* (2023.01); *H04W 72/20* (2023.01); *H04W 72/56* (2023.01)

(58) Field of Classification Search
CPC .... H04W 72/541; H04W 72/56; H04W 72/20
(Continued)

(56) References Cited

U.S. PATENT DOCUMENTS

| | | |
|---|---|---|
| 2019/0059115 A1 | 2/2019 | Uchiyama et al. |
| 2019/0173612 A1 | 6/2019 | Kimura et al. |

(Continued)

FOREIGN PATENT DOCUMENTS

| | | |
|---|---|---|
| CN | 106060947 A | 10/2016 |
| CN | 108632779 A | 10/2018 |

(Continued)

OTHER PUBLICATIONS

EPO Extended European Search Report for corresponding EP Application No. 21756336.0; Mailing Date, Jul. 12, 2023.
(Continued)

*Primary Examiner* — Chi Tang P Cheng
(74) *Attorney, Agent, or Firm* — CANTOR COLBURN LLP (57) ABSTRACT

Disclosed are a method and system for processing resource allocation in V2X communication, and a storage medium. The method is applied to a receiver UE and includes: determining whether there is a conflict between a reserved resource of an interferer UE and a reserved resource of a sender UE; and generating auxiliary information and sending the auxiliary information to the sender UE, in response to determining that there is the conflict. The auxiliary information is used for representing the conflict.

14 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0268915 A1 | 8/2019 | Li et al. | |
| 2019/0297600 A1 | 9/2019 | Kim et al. | |
| 2020/0178256 A1 | 6/2020 | Tang | |
| 2020/0296762 A1 | 9/2020 | Sun et al. | |
| 2021/0045093 A1* | 2/2021 | Rao | H04W 76/14 |
| 2021/0136744 A1 | 5/2021 | Lu et al. | |
| 2021/0219320 A1* | 7/2021 | Belleschi | H04W 72/20 |

FOREIGN PATENT DOCUMENTS

| | | |
|---|---|---|
| CN | 110062465 A | 7/2019 |
| CN | 110741710 A | 1/2020 |
| CN | 114257983 A | 3/2022 |
| JP | 2018029323 A | 2/2018 |
| JP | 2019169981 A | 10/2019 |
| WO | 2019174742 A1 | 9/2019 |
| WO | 2019217852 A1 | 11/2019 |
| WO | 2020011336 A1 | 1/2020 |
| WO | 2020014985 A1 | 1/2020 |
| WO | 2020063742 A1 | 4/2020 |

OTHER PUBLICATIONS

JPO Notice of Reasons for Refusal for corresponding JP Application No. 2022-549595; Mailing Date, Aug. 21, 2023.
CNIPA 1st Office Action for corresponding CN Application No. 202010098781.8; Issued on Jun. 21, 2022.
Huawei et al., "Sidelink resource allocation mode 2 for NR V2X", 3GPP TSG RAN WG1 Meeting #98bis, R1-1910056, Oct. 14-20, 2019, 12 pages.
Qualcomm Incorporated, "Sidelink Resource Allocation Mechanism for NR V2X", 3GPP TSG RAN WG1 Meeting #96, R1-1903345, Feb. 25-Mar. 1, 2019, 12 pages.
Intel Corporation, "Physical Layer Procedures for NR V2X Sidelink Design", 3GPP TSG RAN WG1 RAN1#96, R1-1903450, Feb. 25-Mar. 1, 2019; 14 pages.
International Search Report for International Application No. PCT/CN2021/075651; Date of Mailing, Apr. 25, 2021.
Xiaomi Communication, "On resource allocation of V2x communications", 3GPP TSG RAN WG1 Meeting #95, R1-1813346, Nov. 12-16, 2018; 3 pages.

* cited by examiner

METHOD, SYSTEM, AND DEVICE FOR PROCESSING RESOURCE ALLOCATION IN V2X COMMUNICATION, AND MEDIUM

CROSS REFERENCE TO RELATED APPLICATIONS

This is the U.S. national stage of application No. PCT/CN2021/075651, filed on Feb. 5, 2021. Priority under 35 U.S.C. § 119 (a) and 35 U.S.C. § 365 (b) is claimed from Chinese Application No. 202010098781.8, filed Feb. 18, 2020, the disclosure of which is also incorporated herein by reference.

FIELD

The present disclosure relates to the field of wireless communication, and in particular to a method and system for processing resource allocation in V2X communication, and a device and a medium.

BACKGROUND

The wireless communication technology develops and has been applied in more and more fields. For example, in the field of vehicle communication, vehicle-to-everything (vehicle-to-everything, V2X) technology is dedicated to realizing communication with low latency and high reliability between high-speed devices, between a high-speed device and a low-speed device, or between a high-speed device and a stationary device. The X may represent a vehicle, a pedestrian, an infrastructure, a network, or the like. That is, the V2X may include vehicle-to-vehicle (vehicle-to-vehicle, V2V) communication, vehicle-to-infrastructure (vehicle-to-infrastructure, V2I) communication, vehicle-to-pedestrian (vehicle-to-pedestrian, V2P) communication, vehicle-to-network (vehicle-to-network, V2N) communication, or the like.

The V2X technology is a key technology for an intelligent transportation system in the future. A vehicle can communicate with the outside by the V2X technology to obtain a series of traffic information such as real-time road conditions, road information and pedestrian information, thereby improving driving safety, reducing congestion, improving traffic efficiency, providing in-vehicle entertainment information, and the like.

At present, there are two modes of resource allocation for V2X, i.e., mode1 and mode2. In mode1, resource is scheduled by a base station (evolved Node B, eNB). In mode2, resource is autonomously selected by user equipment (User Equipment, UE). In mode2, the UE autonomously selects a resource from a resource pool for transmission according to certain rules, and V2X Sidelink (side link transmission) communication adopts a perception mechanism to reduce resource conflicts.

User equipment operating in mode2 is always in a resource-perceiving state, and determines a candidate resource. A user equipment serving as a receiver UE, upon receiving a data packet sent by a sender UE, will perceive candidate resources within a period of time before the data packet arrives, and then randomly select, among the candidate resources, resources for next one transmission and subsequent multiple transmissions, and indicate, in SCI (Sidelink Control Information, sidelink control information) for each transmission, the resource used for the current transmission and resource reserved for at most two subsequent transmissions, and a reservation period for the reserved resource.

It is assumed that UE1 to UE5 are operating within a current communication range, a data packet arrives to UE4 at time n, a time period (n−t, n) is used as a resource perceiving window (where t>0), and a time period (n+T1, n+T2) is used as a resource selection window (where T2>T1). UE4 excludes some resource within the resource perceiving window to determine a set of candidate resources. First, UE4 decodes SCI of other UE (such as UE1, UE2, UE3, or UE5) to acquire resource reservation information of the other UE, and measures a RSRP (Reference Signal Receiving Power, reference signal receiving power). In a case of strong interference, that is, the RSRP is higher than a preset threshold, the resource is excluded. If UE4 measures that the RSRP of the reserved resource of UE1 and UE5 is higher than the preset threshold, the RSRP of the reserved resource of UE2 and UE3 is lower than or equal to the preset threshold, UE4 excludes the reserved resources of UE1 and UE5 from the set of candidate resources. The remaining resources in the set of candidate resources are the final candidate resources. UE4 randomly selects, within the selection window, a resource for transmission from the final candidate resources, and indicates, in the SCI of each transmission, the resource used for the current transmission of a same TB (transmission block, transmission block) and the resources used for subsequent multiple transmissions, and indicates a reservation period for the reserved resources used for transmission in different TBs. In mode2, it is supported in the SCI to indicate reserved resources for up to three transmissions and periodic reservation of resources. UEs located near UE4 are able to receive the resource reservation information of UE4 upon perceiving resources.

Figure 1:
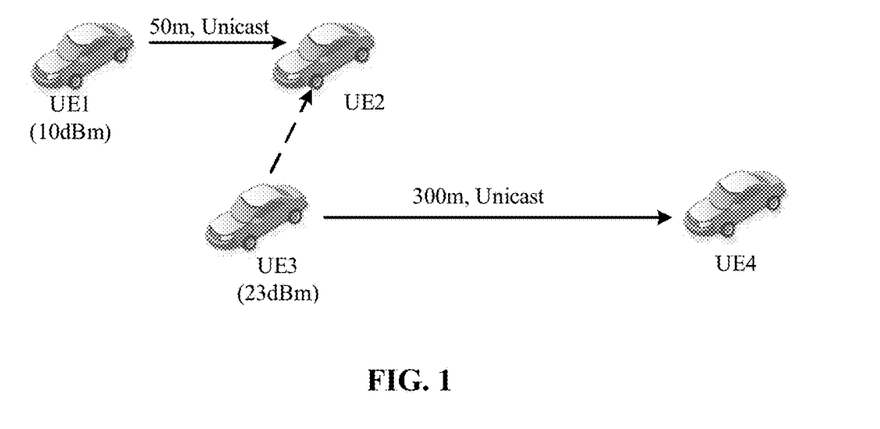
FIG. 1 is a schematic diagram of a scenario where an IBE problem occurs among UE1 to UE4 in the conventional technology.

As shown in FIG. 1, UE1 and UE2 are in unicast communication, in which a communication distance is 50 m (meters), and an emission power is 10 dBm (decibel milliwatt); and UE3 and UE4 are in unicast communication, in which the communication distance is 300 m, and the emission power is 23 dBm. Assuming that UE3 selects a frequency domain resource near the frequency domain resource of UE1, due to the larger emission power of UE3, the receiving end UE2 is to be interfered by UE3. In such case, a greater difference between emission powers for the UEs results in greater interference, causing an IBE (in-band emission) problem.

Figure 2:
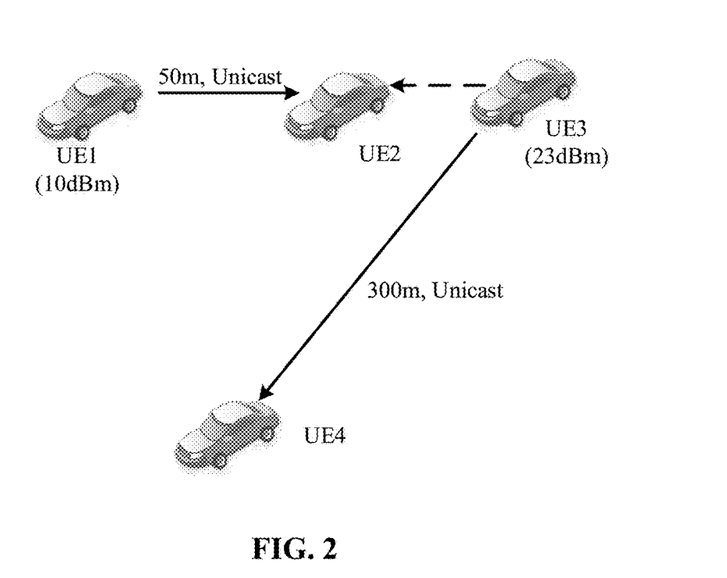
FIG. 2 is a schematic diagram of a scenario where a hidden node problem occurs among UE1 to UE4 in the conventional technology.

FIG. 2 shows a hidden node problem under resource allocation mode2. It is assumed that UE1 and UE2 are in unicast communication, in which the communication distance is 50 m, and the emission power is 10 dBm; UE1 and UE3 are far apart, and UE3 is outside a perceiving range of UE1; UE3 and UE4 are in unicast communication, in which the communication distance is 300 m, and the emission power is 23 dBm. UE1, when perceiving resources, is not aware of the frequency domain resource which is selected by UE3. In a case that UE1 selects a frequency resource same as the frequency domain resource selected by UE3, and uses the frequency resource simultaneously with UE3, a collision will occur and UE2 cannot successfully receive communication data from UE1.

Figure 3:
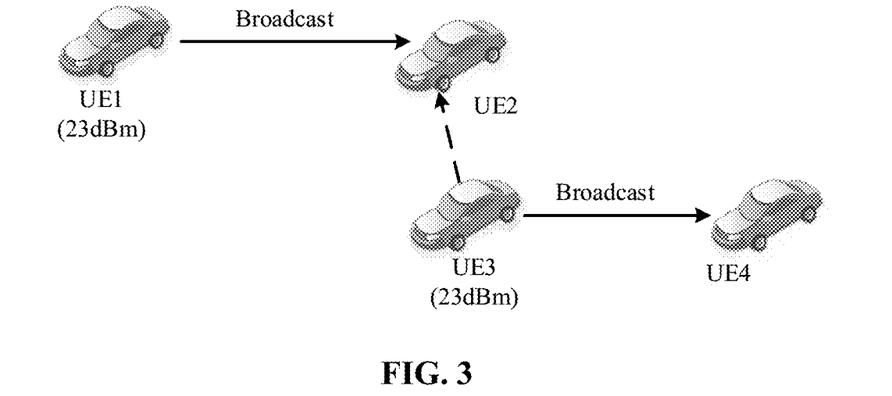
FIG. 3 is a schematic diagram of a scenario where an IBE problem occurs during broadcast communication in LTE V2X mode4 in the conventional technology.

In a conventional technology, the resource allocation mode4 in LTE (Long Term Evolution) V2X is also a resource selection process of UE based on perception. Therefore, the IBE problem also exists in the LTE V2X mode4. As shown in FIG. 3, UE1 and UE3 are in broadcast communication with UE2 and UE4 respectively, both at an emission power of 23 dBm. Assuming that UE1 and UE3 are far away and select resources adjacent to each other, the receiving end, UE2, is to be interfered by UE3. A shorter distance results in greater interference, thereby causing the IBE problem.

In LTE V2X mode4, the IBE problem is solved by using a Zone ID (zone ID) to divide the resource pool, and UEs in different zones use frequency domain resources orthogonal to each other. Since UE1 and UE3 are far apart and belong to different zones, the resources used by UE1 and UE3 are also separated from each other, so that the IBE problem is solved.

In the LTE V2X mode4, only broadcast communication is supported, and the emission powers of UEs are the same, which is the maximum emission power. Therefore, the IBE problem only exists when the sender UE and the interferer UE are far apart. Therefore, in the LTE V2X mode4, Zone ID may be used to divide the resource pool, so that the sender UE and the interferer UE are classified into different Zones, thereby solving the IBE problem.

However, in the NR (New Radio, new radio) V2X mode2, not only broadcast communication but also unicast communication and multicast communication are supported. Since the unicast communication and the multicast communication support an adjustment of the emission power, the IBE problem exists not only in the situation having a long communication distance and a same emission power, but also in a situation having a relative short communication distance but a large difference among emission powers. Therefore, the method of dividing the resource pool by Zone ID cannot solve the IBE problem in the NR V2X mode2. Moreover, the method of dividing the resource pool by Zone ID is not supported in NR V2X mode2.

In the resource allocation mode2 of V2X communication, UE performs V2V (vehicle to vehicle) communication by perceiving and selecting resources. In a case that the sender UE is not aware of situations at a receiver UE side when perceiving and selecting resources, there may be an IBE (In-Band-Emission) problem or hidden node problem at the receiver UE side, so that the receiver UE cannot successfully receive over the resource selected by the sender UE. Further, since periodic reservation of resources is supported in the V2X mode2, continuous collision and other conflict problem may occur, resulting in low accuracy in sending and receiving information.

SUMMARY

A technical problem to be solved by the present disclosure is that in an autonomous resource-selection mode in V2X communication according to the conventional technology, a receiver UE cannot successfully receive over the resource selected by a sender UE resulting in low accuracy in sending and receiving information. Therefore, a method and system for processing resource allocation in V2X communication, and a device and a medium are provided in the present disclosure.

The above technical problem is solved in the present disclosure through the following technical solutions.

A method for processing resource allocation in V2X communication is provided. The method for processing resource allocation in V2X communication is applied to a receiver UE, and includes:

determining whether there is a conflict between a reserved resource of an interferer UE and a reserved resource of a sender UE; and generating auxiliary information and sending the auxiliary information to the sender UE, in response to determining that there is the conflict, the auxiliary information being used for representing the conflict.

In an embodiment, said determining whether there is the conflict between the reserved resource of the interferer UE and the reserved resource of the sender UE includes:

determining whether there is an IBE problem or a hidden node problem between the reserved resource of the sender UE and the reserved resource of the interferer UE; and determining there is the conflict, in response to determining that there is the IBE problem or the hidden node problem between the reserved resource of the sender UE and the reserved resource of the interferer UE.

In an embodiment, said determining whether there is the IBE problem or the hidden node problem between the reserved resource of the sender UE and the reserved resource of the interferer UE includes:

determining whether the reserved resource of the sender UE is adjacent to or the same as the reserved resource of the interferer UE;

determining, in response to the reserved resource of the sender UE being adjacent to or the same as the reserved resource of the interferer UE, whether a RSRP of the adjacent or the same reserved resource exceeds a preset threshold; and determining there is the IBE problem or the hidden node problem, in response to the RSRP of the adjacent or the same reserved resource exceeding the preset threshold.

In an embodiment, the auxiliary information includes a conflict type for representing the IBE problem or the hidden node problem.

In an embodiment, the auxiliary information further includes a priority of transmission data, and the transmission data refers to data transmitted by the reserved resource; the method further includes:

determining whether a priority of transmission data in the sender UE is lower than or equal to a priority of transmission data in the interferer UE, in response to determining that there is the IBE problem or the hidden node problem between the reserved resource of the sender UE and the reserved resource of the interferer UE; and determining there is the conflict, in response to the priority of the transmission data in the sender UE being lower than or equal to the priority of the transmission data in the interferer UE.

In an embodiment, the auxiliary information includes the reserved resource of the interferer UE.

In an embodiment, the auxiliary information further includes a reservation period of the reserved resource of the interferer UE.

In an embodiment, said sending the auxiliary information to the sender UE includes: sending the auxiliary information to the sender UE through SCI data.

In an embodiment, said sending the auxiliary information to the sender UE through SCI data includes:

generating new SCI data, the new SCI data including the auxiliary information; and sending the new SCI data to the sender UE;

or, said sending the auxiliary information to the sender UE through SCI data includes:

adding the auxiliary information into SCI data to form new SCI data;

generating a new radio network temporary identifier based on the auxiliary information;

scrambling the new SCI data by using the new radio network temporary identifier; and sending the scrambled new SCI data to the sender UE.

In an embodiment, said sending the auxiliary information to the sender UE includes:

sending the auxiliary information to the sender UE through a PC5-RRC signaling.

A method for processing resource allocation in V2X communication is provided. The method for processing resource allocation in V2X communication is applied to a sender UE, and includes:

acquiring auxiliary information fed back by a receiver UE, the auxiliary information being used for representing a conflict between a reserved resource of the sender UE and a reserved resource of an interferer UE; and adjusting the reserved resource of the sender UE based on the auxiliary information, to avoid the conflict.

In an embodiment, adjusting the reserved resource of the sender UE based on the auxiliary information includes:

reselecting the reserved resource of the sender UE; or increasing an emission power of the reserved resource of the sender UE.

In an embodiment, the auxiliary information includes a conflict type for representing an IBE problem or a hidden node problem; and said reselecting the reserved resource of the sender UE includes:

selecting a candidate resource other than a resource adjacent to the reserved resource of the sender UE, in response to the conflict type being the IBE problem; and selecting a candidate resource other than the reserved resource of the sender UE, in response to the conflict type being the hidden node problem.

In an embodiment, the auxiliary information includes the reserved resource of the interferer UE; and said reselecting the reserved resource of the sender UE includes:

selecting a candidate resource other than a resource adjacent to or the same as the reserved resource of the interferer UE.

In an embodiment, the auxiliary information further includes a reservation period of the reserved resource; and the method for processing resource allocation in V2X communication further includes:

determining whether a reservation period of the reserved resource of the sender UE is the same as a reservation period of the reserved resource of the interferer UE, before selecting the candidate resource other than the resource adjacent to or the same as the reserved resource of the interferer UE; and selecting the candidate resource other than the resource adjacent to or the same as the reserved resource of the interferer UE, in response to the reservation period of the reserved resource of the sender UE being the same as the reservation period of the reserved resource of the interferer UE.

A method for processing resource allocation in V2X communication is provided. The method for processing resource allocation in V2X communication includes:

sending, by a receiver UE, auxiliary information to a sender UE through the method as described above, the auxiliary information being used for representing a conflict between a reserved resource of the sender UE and a reserved resource of an interferer UE, so as to avoid the conflict; and adjusting, by the sender UE, the reserved resource based on the auxiliary information through the method as described above.

A system for processing resource allocation in V2X communication is provided. The system for processing resource allocation in V2X communication is applied to a receiver UE. The system for processing resource allocation in V2X communication includes a determination module and a feedback module;

the determination module is configured to: determine whether there is a conflict between a reserved resource of an interferer UE and a reserved resource of a sender UE, and call the feedback module in response to determining that there is the conflict;

the feedback module is configured to: generate auxiliary information and send the auxiliary information to the sender UE, the auxiliary information being used for representing the conflict.

In an embodiment, the determination module is further configured to: determine whether there is an IBE problem or a hidden node problem between the reserved resource of the sender UE and the reserved resource of the interferer UE; and determine there is the conflict, in response to determining there is the IBE problem or the hidden node problem between the reserved resource of the sender UE and the reserved resource of the interferer UE.

In an embodiment, the determination module is further configured to: determine whether the reserved resource of the sender UE is adjacent to or the same as the reserved resource of the interferer UE; determine, in response to the reserved resource of the sender UE being adjacent to or the same as the reserved resource of the interferer UE, whether a RSRP of the adjacent or the same reserved resource exceeds a preset threshold; and determine there is the IBE problem or the hidden node problem, in response to the RSRP of the adjacent or the same reserved resource exceeding the preset threshold.

In an embodiment, the auxiliary information includes a conflict type for representing the IBE problem or the hidden node problem.

In an embodiment, the auxiliary information further includes a priority of transmission data, and the transmission data refers to data transmitted by the reserved resource; and the determination module is further configured to: determine whether a priority of transmission data in the sender UE is lower than or equal to a priority of transmission data in the interferer UE, in response to determining that there is the IBE problem or the hidden node problem between the reserved resource of the sender UE and the reserved resource of the interferer UE; and determine there is the conflict, in response to the priority of the transmission data in the sender UE being lower than or equal to the priority of the transmission data in the interferer UE.

In an embodiment, the auxiliary information includes the reserved resource of the interferer UE.

In an embodiment, the auxiliary information further includes a reservation period of the reserved resource of the interferer UE.

In an embodiment, wherein the feedback module is further configured to send the auxiliary information to the sender UE through SCI data.

In an embodiment, the feedback module is further configured to: generate new SCI data including the auxiliary information, and send the new SCI data to the sender UE; or
the feedback module is further configured to: add the auxiliary information into SCI data to form new SCI data, generate a new radio network temporary identifier based on the auxiliary information, scramble the new SCI data by using the new radio network temporary identifier, and send the scrambled new SCI data to the sender UE.

In an embodiment, the feedback module is further configured to send the auxiliary information to the sender UE through a PC5-RRC signaling.

A system for processing resource allocation in V2X communication is provided. The system for processing resource allocation in V2X communication is applied to a sender UE. The system for processing resource allocation in V2X communication includes an acquisition module and an adjustment module;
the acquisition module is configured to acquire auxiliary information fed back by a receiver UE, the auxiliary information being used for representing a conflict between a reserved resource of the sender UE and a reserved resource of an interferer UE; and
the adjustment module is configured to adjust the reserved resource of the sender UE based on the auxiliary information to avoid the conflict.

In an embodiment, the adjustment module is configured to: reselect the reserved resource of the sender UE; or increase an emission power of the reserved resource of the sender UE.

In an embodiment, the auxiliary information includes a conflict type for representing an IBE problem or a hidden node problem; and
the adjustment module is further configured to: select a candidate resource other than a resource adjacent to the reserved resource of the sender UE, in response to the conflict type being the IBE problem; and select a candidate resource other than the reserved resource of the sender UE, in response to the conflict type being the hidden node problem.

In an embodiment, the auxiliary information includes the reserved resource of the interferer UE; and
the adjustment module is further configured to select a candidate resource other than a resource adjacent to or the same as the reserved resource of the interferer UE.

In an embodiment, the auxiliary information further includes a reservation period of the reserved resource; and
the adjustment module is further configured to: determine whether a reservation period of the reserved resource of the sender UE is the same as a reservation period of the reserved resource of the interferer UE, and select the candidate resource other than the resource adjacent to or the same as the reserved resource of the interferer UE, in response to the reservation period of the reserved resource of the sender UE being the same as the reservation period of the reserved resource of the interferer UE.

A system for processing resource allocation in V2X communication is provided. The system for processing resource allocation in V2X communication includes the system applied to a sender UE as described above and the system applied to a receiver UE as described above.

An electronic device is provided, including a memory, a processor, and a computer program stored in the memory and executable on the processor. The processor, when executing the computer program, implements the method for processing resource allocation in V2X communication and applied to the sender UE as described above, or the method for processing resource allocation in V2X communication and applied to the receiver UE as described above, or the method for processing resource allocation in V2X communication and applied to the sender UE and the receiver UE as described above.

A computer-readable storage medium storing a computer program is provided. The computer program, when executed by a processor, causes steps of the method for processing resource allocation in V2X communication and applied to the sender UE as described above, or the method for processing resource allocation in V2X communication and applied to the receiver UE as described above, or the method for processing resource allocation in V2X communication and applied to the sender UE and the receiver UE as described above, to be performed.

Advantageous effects of the present disclosure are described below.

According to the present disclosure, by receiving the reserved resource sent from the sender UE and the reserved resource sent from the interferer UE, it is determined whether there is a conflict between the reserved resource of the interferer UE and the reserved resource of the sender UE; if there is the conflict, auxiliary information is generated and sent to the sender UE. In this way, the sender UE can clearly know situations at the receiver UE side when perceiving and selecting resources, and thus the sender UE can adjust the resources based on the auxiliary information so as to resolve the conflict.

DETAILED DESCRIPTION

Hereinafter the present disclosure is described by way of embodiments, but the present disclosure is not limited to the scope of the described embodiments.

It should be noted that an execution subject of a method for processing resource allocation in V2X communication disclosed in embodiments of the present disclosure may be a separate chip, chip module, or UE, or may be a chip or chip module integrated in a UE.

A system for processing resource allocation in V2X communication described in the embodiments of the present disclosure may specifically be a separate chip, chip module or UE, or may be a chip or chip module integrated in a UE. Each module/unit contained in the system for processing resource allocation in V2X communication may be a software module/unit, or a hardware module/unit, or a part of modules/units may be a software module/unit and another part of modules/units may be a hardware module/unit. For example, for each device and product applied to or integrated in a chip, each of modules/units included therein may be implemented by hardware such as a circuit. Alternatively, at least some of the modules/units may be implemented by a software program running on a processor integrated in the chip, and the remaining ones of the modules/units may be implemented by hardware such as a circuit. For each device and product applied to or integrated in a chip module, each of modules/units included therein may be all implemented by hardware such as a circuit, and different modules/units may be located in a same component (such as a chip, a circuit module, or the like) or in different components of the chip module. Alternatively, at least some of the modules/units may be implemented by a software program running on a processor integrated in the chip module, and the remaining ones of the modules/units may be implemented by hardware such as a circuit. For each device and product applied to or integrated in a UE, each of modules/units included therein may be all implemented by hardware such as a circuit, and different modules/units may be located in a same component (such as a chip, a circuit module, or the like) or in different components in the terminal. Alternatively, at least some of the modules/units may be implemented by a software program running on a processor integrated in the UE, and the remaining ones of the modules/units may be implemented by hardware such as a circuit.

First Embodiment

A method for processing resource allocation in V2X communication is provided in an embodiment of the present disclosure. The method is applied to a receiver UE.

Figure 4:
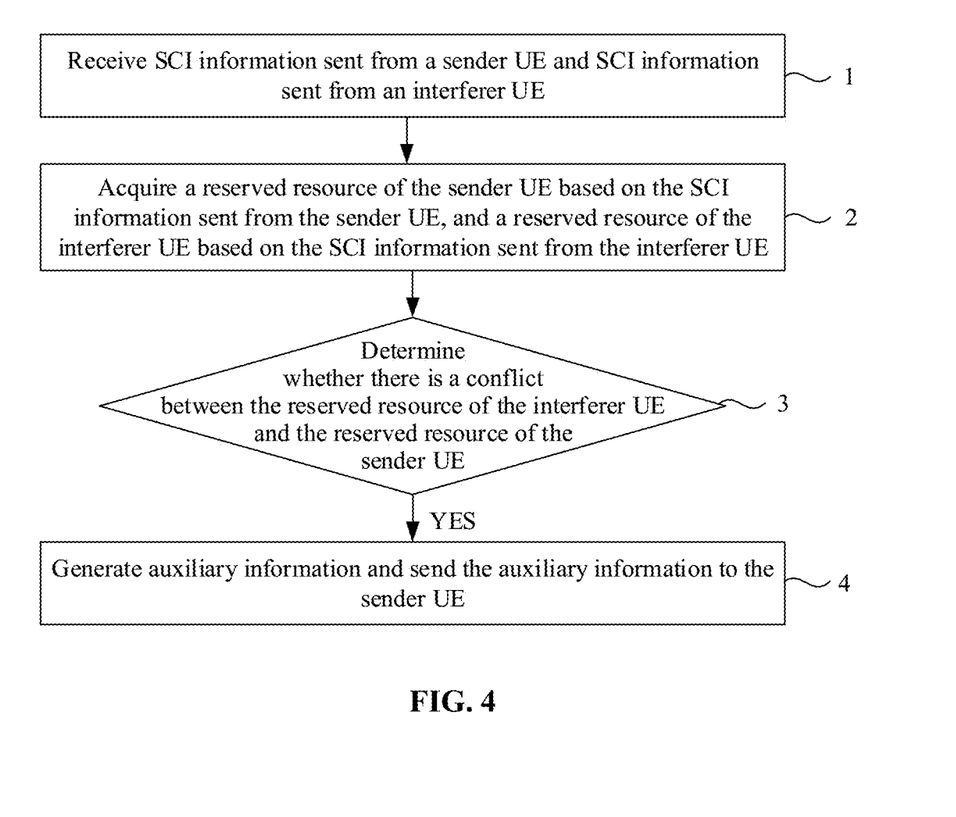
FIG. 4 is a flowchart of a method for processing resource allocation in V2X communication according to a first embodiment of the present disclosure.

As shown in FIG. 4, the method for processing resource allocation in V2X communication includes step 1 to step 4 as follows.

In step 1, SCI information sent from a sender UE and SCI information sent from an interferer UE are received.

The SCI information includes reserved resource.

In step 2, a reserved resource of the sender UE is acquired based on the SCI information sent from the sender UE, and a reserved resource of the interferer UE is acquired based on the SCI information sent from the interferer UE.

In step 3, it is determined whether there is a conflict between the reserved resource of the interferer UE and the reserved resource of the sender UE. The process proceeds to step 4, in response to determining there is the conflict.

In step 4, auxiliary information is generated and sent to the sender UE.

The auxiliary information is used for representing the conflict.

According to the embodiment, it is determined whether there is a conflict between the reserved resource of the interferer UE and the reserved resource of the sender UE, and if it is determined there is the conflict, auxiliary information is generated and sent to the sender UE. Thereby, the sending UE can clearly know conditions at a receiver UE side when perceiving and selecting resources, so that the sender UE can adjust resources based on the auxiliary information, thus to resolve the conflict.

Second Embodiment

Figure 5:
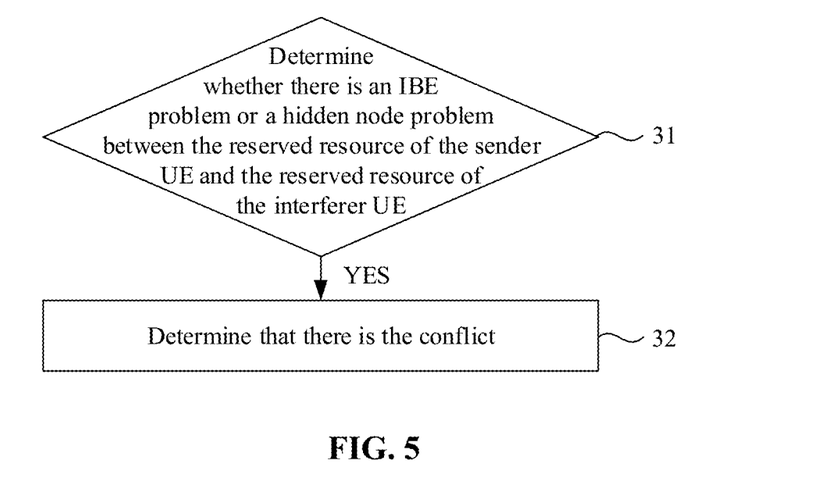
FIG. 5 is a flowchart of step 3 in a method for processing resource allocation in V2X communication according to a second embodiment of the present disclosure.

A method for processing resource allocation in V2X communication is provided in an embodiment of the present disclosure. Differences of the method in the second embodiment from the method in the first embodiment are described below. As shown in FIG. 5, the step 3 includes step 31 and step 32.

In step 31, it is determined whether there is an IBE problem or a hidden node problem between the reserved resource of the sender UE and the reserved resource of the interferer UE. The process proceeds to step 32, in response to determining there is the IBE problem or the hidden node problem.

In step 32, it is determined that there is the conflict.

Figure 6:
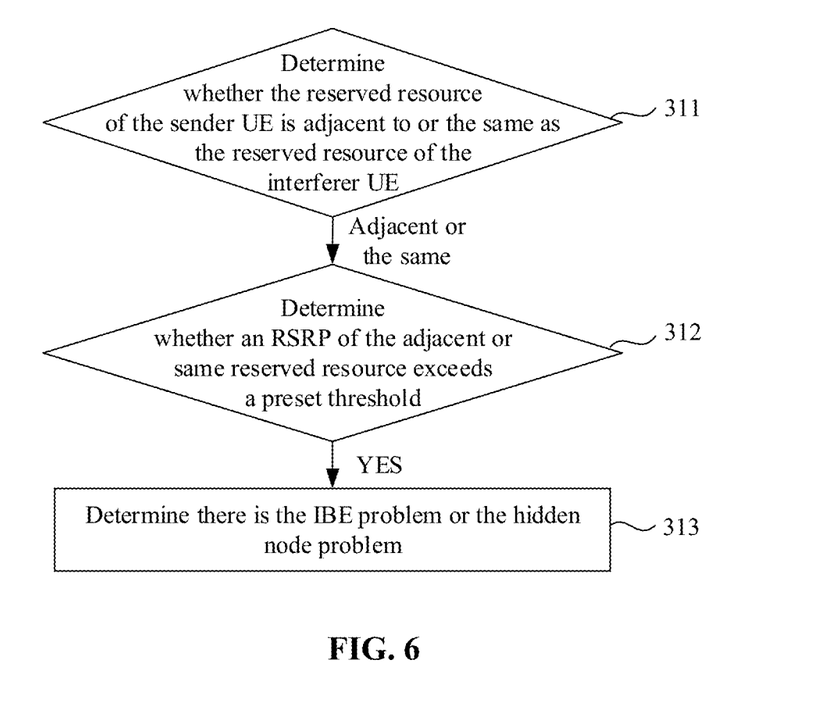
FIG. 6 is a flowchart of step 31 in the method for processing resource allocation in V2X communication according to the second embodiment of the present disclosure.

As shown in FIG. 6, the step 31 includes step 311 to step 313.

In step 311, it is determined whether the reserved resource of the sender UE is adjacent to or the same as the reserved resource of the interferer UE. The process proceeds to step 312, in response to determining that the reserved resource of the sender UE is adjacent to or the same as the reserved resource of the interferer UE.

In step 312, it is determined whether a RSRP of the adjacent or same reserved resource exceeds a preset threshold. The process proceeds to step 313, in response to determining that the RSRP of the adjacent or same reserved resource exceeds the preset threshold.

In step 313, it is determined there is the IBE problem or the hidden node problem.

The auxiliary information includes a conflict type. The conflict type is used for representing the IBE problem or the hidden node problem.

Figure 7:
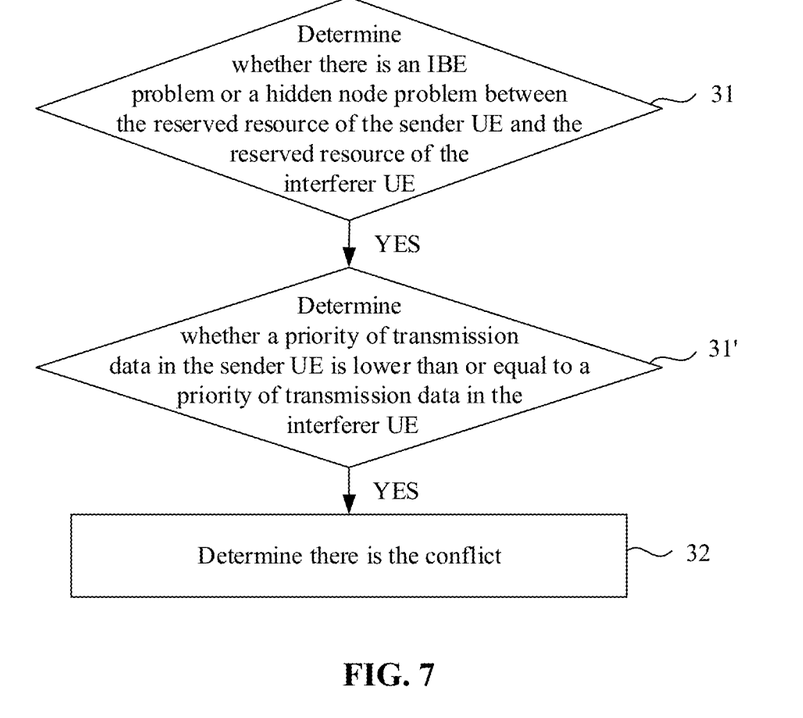
FIG. 7 is a flowchart of step 31' in the method for processing resource allocation in V2X communication according to the second embodiment of the present disclosure.

The auxiliary information further includes a priority of transmission data. The transmission data refers to data transmitted by the reserved resource. In order to further improve an accuracy in determining the conflict, the method for processing resource allocation in V2X communication further includes step 31', as shown in FIG. 7. The process proceeds to the step 31', in response to determining in the step 31 that there is the IBE problem or the hidden node problem.

In step 31', it is determined whether a priority of transmission data in the sender UE is lower than or equal to a priority of transmission data in the interferer UE. The process proceeds to the step 32, in response to determining that the priority of the transmission data in the sender UE is lower than or equal to the priority of the transmission data in the interferer UE.

The auxiliary information includes the reserved resource of the interferer UE.

The auxiliary information further includes a reservation period of the reserved resource of the interferer UE.

The step 4 includes step 41. In step 41, the auxiliary information is sent to the sender UE through SCI data.

Alternatively, the step 4 includes step 41'. In step 41', the auxiliary information is sent to the sender UE through a PC5-RRC signaling.

Figure 8:
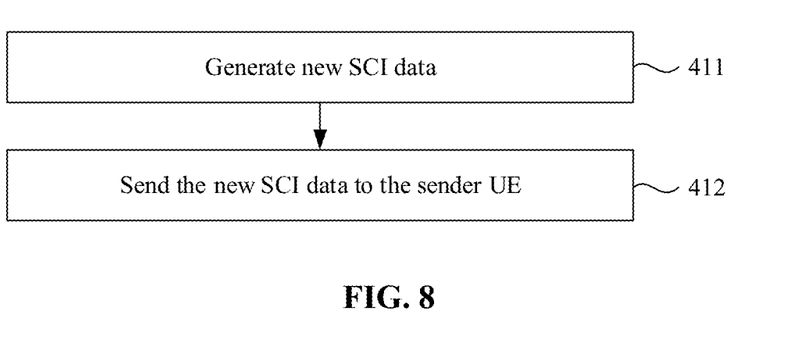
FIG. 8 is a flowchart of step 41 in the method for processing resource allocation in V2X communication according to the second embodiment of the present disclosure.

As shown in FIG. 8, step 41 includes step 411 and step 412.

In step 411, new SCI data is generated. The new SCI data includes the auxiliary information.

In step 412, the new SCI data is sent to the sender UE.

Figure 9:
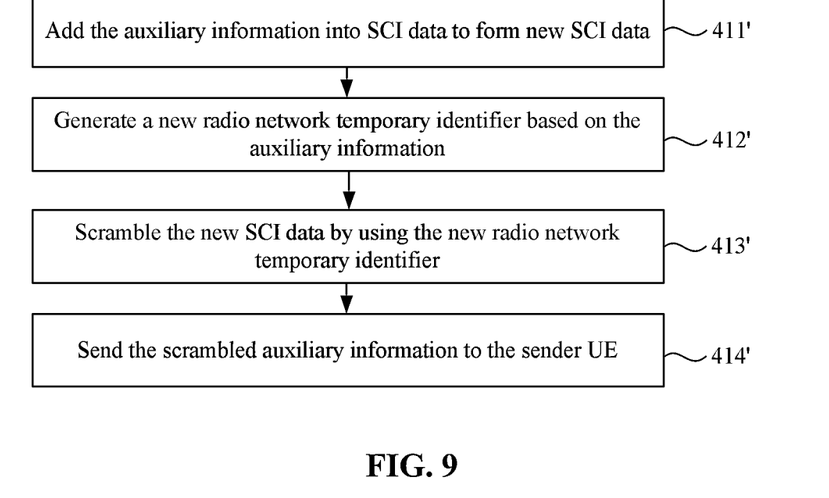
FIG. 9 is another flowchart of step 41 in the method for processing resource allocation in V2X communication according to the second embodiment of the present disclosure.

Alternatively, as shown in FIG. 9, the step 41 includes step 411' to step 414'.

In step 411', the auxiliary information is added into SCI data to form new SCI data.

In step 412', a new radio network temporary identifier is generated based on the auxiliary information.

In step 413', the new SCI data is scrambled by using the new radio network temporary identifier.

In step 414', the scrambled auxiliary information is sent to the sender UE.

According to the embodiment, the auxiliary information of the receiver UE is utilized. Thereby, the sender UE can clearly know conditions at the receiver UE side when perceiving and selecting resources, so that the sender UE can adjust resources based on the auxiliary information so as to resolve the conflict, which solves the IBE problem and the hidden node problem under a resource allocation mode2 of V2X communication, avoids continuous collision, and improves reliability of the V2X communication system and a utilization rate of resources.

Third Embodiment

A method for processing resource allocation in V2X communication is further provided in an embodiment of the present disclosure. The method for processing resource allocation in V2X communication is applied to a sender UE.

Figure 10:
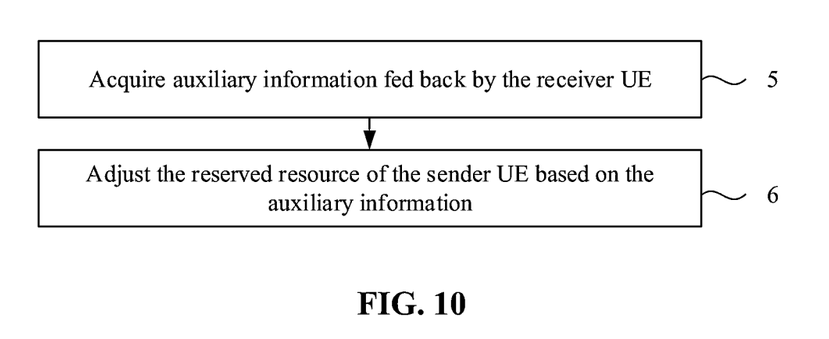
FIG. 10 is a flowchart of a method for processing resource allocation in V2X communication according to a third embodiment of the present disclosure.

As shown in FIG. 10, the method for processing resource allocation in V2X communication includes step 5 and step 6.

In step 5, auxiliary information fed back by a receiver UE is acquired. The auxiliary information is used for representing a conflict between a reserved resource of the sender UE and a reserved resource of an interferer UE.

In step 6, the reserved resource of the sender UE is adjusted based on the auxiliary information, to avoid the conflict.

According to the embodiment, by acquiring the auxiliary information fed back by the receiver UE, the sender UE can clearly know conditions at the receiver UE side when perceiving and selecting resources, so that the sender UE can adjust the resources based on the auxiliary information to solve the conflict, thereby solving the IBE problem and hidden node problem in the resource allocation mode2 of V2X communication, avoiding resource collision, and improving reliability of the V2X communication system and a utilization rate of resources.

Fourth Embodiment

A method for processing resource allocation in V2X communication is provided in an embodiment. Differences of the method in the fourth embodiment from the method in the third embodiment are described below.

The step 6 includes step 61. In step 61, the reserved resource of the sender UE is reselected.

Alternatively, the step 6 includes step 62. In step 62, an emission power of the reserved resource of the sender UE is increased.

The auxiliary information includes a conflict type. The conflict type is used for representing an IBE problem or a hidden node problem.

Figure 11:
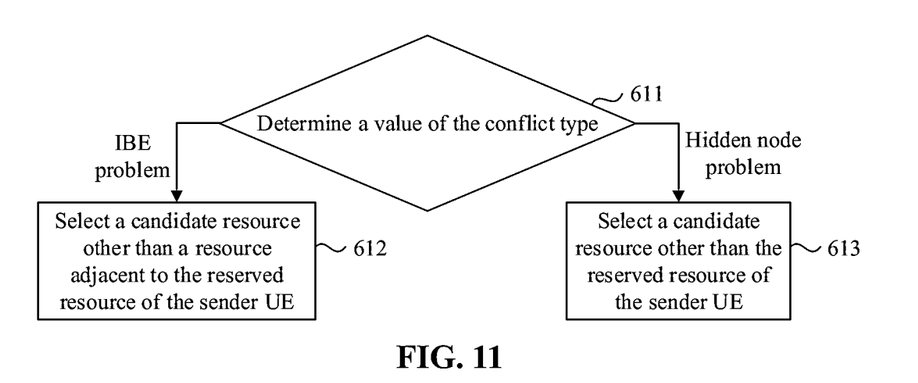
FIG. 11 is a flowchart of step 61 in a method for processing resource allocation in V2X communication according to a fourth embodiment of the present disclosure.

As shown in FIG. 11, the step 61 includes step 611 to step 613.

In step 611, a value of the conflict type is determined. The process proceeds to step 612, in response to the conflict type being the IBE problem. The process proceeds to step 613, in response to the conflict type being the hidden node problem.

In step 612, a candidate resource other than a resource adjacent to the reserved resource of the sender UE is selected.

In step 613, a candidate resource other than the reserved resource of the sender UE is selected.

Alternatively, in order to improve efficiency and accuracy of resource adjustment, the auxiliary information may include the reserved resource of the interferer UE, and the step 61 includes step 611'.

In step 611', a candidate resource other than a resource adjacent to or the same as the reserved resource of the interferer UE is selected.

In order to further improve the efficiency and accuracy of resource adjustment, the auxiliary information may further include a reservation period of the reserved resource, so as to avoid a periodic conflict.

The method further includes step 610 before the step 611'.

In step 610, it is determined whether a reservation period of the reserved resource of the sender UE is the same as a reservation period of the reserved resource of the interferer UE. The process proceeds to the step 611', in response to the reservation period of the reserved resource of the sender UE being the same as the reservation period of the reserved resource of the interferer UE.

By adjusting the resources based on the reservation period, a periodic conflict is avoided, thereby avoiding continuous resource collision, and further improving reliability of the V2X communication system and a utilization rate of resources.

Fifth Embodiment

Figure 12:
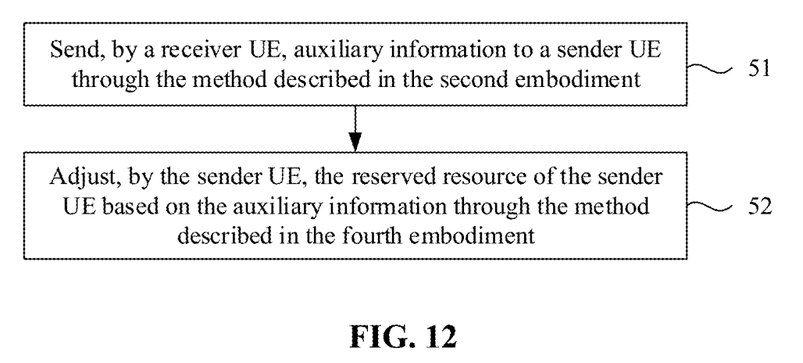
FIG. 12 is a flowchart of a method for processing resource allocation in V2X communication according to a fifth embodiment of the present disclosure.

A method for processing resource allocation in V2X communication is provided in an embodiment. As shown in FIG. 12, the method for processing resource allocation in V2X communication in the fifth embodiment includes step 51 and step 52.

In step 51, auxiliary information is sent from a receiver UE to a sender UE through the method described in the second embodiment. The auxiliary information is used for representing a conflict between a reserved resource of the sender UE and a reserved resource of an interferer UE.

In step 52, the reserved resource of the sender UE is adjusted by the sender UE based on the auxiliary information through the method described in the fourth embodiment, so as to avoid the conflict.

In the fifth embodiment, by receiving the reserved resource sent by the sender UE and the reserved resource sent by the interferer UE, the receiver UE can determine whether there is a conflict between the reserved resource of the interferer UE and the reserved resource of the sender UE. If it is determined there is the conflict, auxiliary information is generated and sent to the sender UE. By acquiring the auxiliary information fed back by the receiver UE, the sending UE can clearly know conditions at the receiver UE side when perceiving and selecting resources, so as to adjust the resources based on the auxiliary information to resolve the conflict, which thus resolves the IBE problem and the hidden node problem in the resource allocation mode2 of V2X communication, avoids resource collision, and improves reliability of a V2X communication process and a utilization rate of resources.

Sixth Embodiment

A system for processing resource allocation in V2X communication is further provided in an embodiment. The system for processing resource allocation in V2X communication is applied to a receiver UE.

Figure 13:
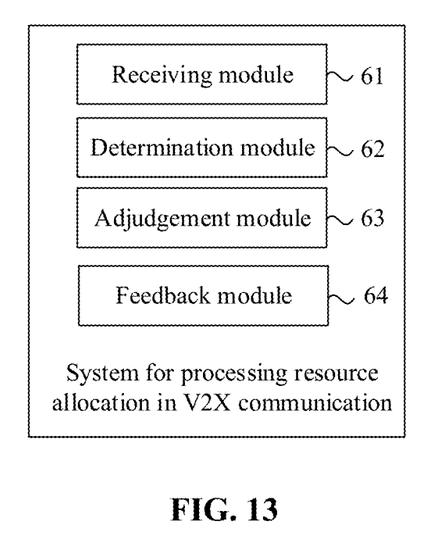
FIG. 13 is a schematic block diagram of a system for processing resource allocation in V2X communication according to a sixth embodiment of the present disclosure.

As shown in FIG. 13, the system for processing resource allocation in V2X communication includes a receiving module 61, a determination module 62, an adjudgment module 63, and a feedback module 64.

The receiving module 61 is configured to receive SCI information sent from a sender UE and SCI information sent from an interferer UE. The SCI information includes reserved resource.

The determination module 62 is configured to acquire a reserved resource of the sender UE based on the SCI information sent from the sender UE, and acquire a reserved resource of the interferer UE based on the SCI information sent from the interferer UE.

The receiving module 61 and the determination module 62 may be implemented by the conventional technology.

The adjudgment module 63 is configured to determine whether there is a conflict between the reserved resource of the interferer UE and the reserved resource of the sender UE, and call the feedback module in response to determining that there is the conflict.

The feedback module 64 is configured to generate auxiliary information and send the auxiliary information to the sender UE. The auxiliary information is used for representing the conflict.

According to the sixth embodiment, by receiving the reserved resource sent from the sender UE and the reserved resource sent from the interferer UE, it is determined whether there is a conflict between the reserved resource of the interferer UE and the reserved resource of the sender UE. If it is determined there is the conflict, auxiliary information is generated and sent to the sender UE, such that the sender UE can clearly know conditions at the receiver UE side when perceiving and selecting resources, and thus the sender UE can adjust the resources based on the auxiliary information to resolve the conflict.

Seventh Embodiment

A system for processing resource allocation in V2X communication is provided in an embodiment. Compared with the sixth embodiment, the adjudgment module 63 in the seventh embodiment is further configured to determine whether there is an IBE problem or a hidden node problem between the reserved resource of the sender UE and the reserved resource of the interferer UE and determine there is the conflict in response to determining that there is the IBE problem or the hidden node problem.

The adjudgment module 63 is further configured to: determine whether the reserved resource of the sender UE is adjacent to or the same as the reserved resource of the interferer UE; determine whether a RSRP of the adjacent or same reserved resource exceeds a preset threshold, in response to the reserved resource of the sender UE being adjacent to or the same as the reserved resource of the interferer UE; and determine there is the IBE problem or the hidden node problem, in response to the RSRP of the adjacent or same reserved resource exceeding the preset threshold.

The auxiliary information includes a conflict type. The conflict type is used for representing the IBE problem or the hidden node problem.

The auxiliary information further includes a priority of transmission data. The transmission data refers to data transmitted by the reserved resource.

The adjudgment module 63 is further configured to: determine whether a priority of transmission data in the sender UE is lower than or equal to a priority of transmission data in the interferer UE, after determining that there is the IBE problem or the hidden node problem between the reserved resource of the sender UE and the reserved resource of the interferer UE; and determine there is the conflict, in response to the priority of the transmission data in the sender UE being lower than or equal to the priority of the transmission data in the interferer UE.

The auxiliary information includes the reserved resource of the interferer UE.

The auxiliary information further includes a reservation period of the reserved resource of the interferer UE.

The feedback module 64 is further configured to send the auxiliary information to the sender UE through SCI data.

The feedback module 64 is further configured to: generate new SCI data including the auxiliary information; and send the new SCI data to the sender UE.

Alternatively, the feedback module 64 is further configured to: add the auxiliary information into SCI data to form new SCI data; generate a new radio network temporary identifier based on the auxiliary information; scramble the new SCI data by using the new radio network temporary identifier; and send the scrambled new SCI data to the sender UE.

The feedback module 64 is further configured to send the auxiliary information to the sender UE through a PC5-RRC signaling.

According to this embodiment, the auxiliary information of the receiver UE is utilized. Thereby, the sender UE can clearly know conditions at the receiver UE side when perceiving and selecting resources, so that the sender UE can adjust resources based on the auxiliary information so as to resolve the conflict, which solves the IBE problem and the hidden node problem under a resource allocation mode2 of V2X communication, avoids continuous collision, and improves reliability of the V2X communication system and a utilization rate of resources.

Eighth Embodiment

A system for processing resource allocation in V2X communication is further provided in an embodiment. The system for processing resource allocation in V2X communication is applied to a sender UE.

Figure 14:
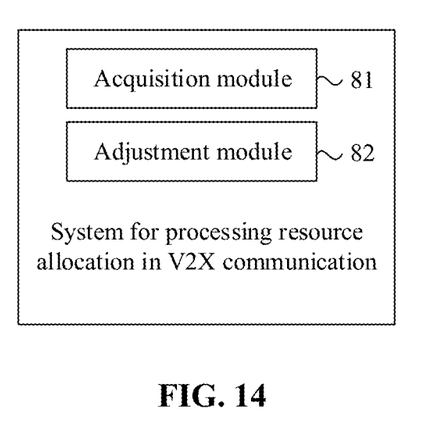
FIG. 14 is a schematic block diagram of a system for processing resource allocation in V2X communication according to an eighth embodiment of the present disclosure.

As shown in FIG. 14, the system for processing resource allocation in V2X communication includes an acquisition module 81 and an adjustment module 82.

The acquisition module 81 is configured to acquire auxiliary information fed back by a receiver UE. The auxiliary information is used for representing a conflict between a reserved resource of the sender UE and a reserved resource of an interferer UE.

The adjustment module 82 is configured to adjust the reserved resource of the sender UE based on the auxiliary information to avoid a conflict.

According to the embodiment, by acquiring the auxiliary information fed back by the receiver UE, the sender UE can clearly know conditions at the receiver UE side when perceiving and selecting resources, so as to adjust the resources based on the auxiliary information to resolve the conflict, which thus solves the IBE problem and hidden node problem in the resource allocation mode2 of V2X communication, avoids resource collision, and improves reliability of the V2X communication system and a utilization rate of resources.

Ninth Embodiment

A system for processing resource allocation in V2X communication is further provided in an embodiment. A difference of the system in the ninth embodiment from the system in the eighth embodiment is that: the adjustment module 82 in the ninth embodiment is configured to reselect the reserved resource of the sender UE, or increase an emission power of the reserved resource of the sender UE.

In an example, the auxiliary information includes a conflict type. The conflict type is used for representing an IBE problem or a hidden node problem.

The adjustment module 82 is further configured to select a candidate resource other than a resource adjacent to the reserved resource of the sender UE, in response to the conflict type being the IBE problem; and select a candidate resource other than the reserved resource of the sender UE, in response to the conflict type being the hidden node problem.

In an example, the auxiliary information includes the reserved resource of the interferer UE.

The adjustment module 82 is further configured to: select a candidate resource other than a resource adjacent to or the same as the reserved resource of the interferer UE.

In an example, the auxiliary information further includes a reservation period of the reserved resource.

The adjustment module 82 is further configured to: determine whether a reservation period of the reserved resource of the sender UE is same as a reservation period of the reserved resource of the interferer UE; and select a candidate resource other than a resource adjacent to or the same as the reserved resource of the interferer UE, in response to the reservation period of the reserved resource of the sender UE being the same as the reservation period of the reserved resource of the interferer UE.

By adjusting the resource based on the reservation period, a periodic conflict is avoided, thereby avoiding continuous resource collision, and further improving reliability of the V2X communication system and a utilization rate of resources.

Tenth Embodiment

A system for processing resource allocation in V2X communication is further provided in an embodiment. The system for processing resource allocation in V2X communication includes the system disclosed in the sixth embodiment and the system disclosed in the ninth embodiment.

The system in the sixth embodiment is configured to send the auxiliary information to the sender UE. The auxiliary information is used for representing a conflict between the reserved resource of the sender UE and the reserved resource of the interferer UE.

The sender UE is configured to adjust the reserved resource based on the auxiliary information through the system in the ninth embodiment.

According to the embodiment, the receiver UE receives SCI information sent from the sender UE and SCI information sent from the interferer UE, respectively, and acquires a reserved resource of the sender UE based on the SCI information sent from the sender UE, and acquires a reserved resource of the interferer UE based on the SCI information sent from the interferer UE. The receiver UE determines whether there is a conflict between the reserved resource of the interferer UE and the reserved resource of the sender UE, generates auxiliary information in response to determining that there is the conflict, and sends the auxiliary information to the sender UE. The sender UE acquires the auxiliary information fed back by the receiver UE, so that the sender UE can clearly know conditions at the receiver UE side when perceiving and selecting a resource, and can adjust the resource based on the auxiliary information to resolve the conflict, thereby solving an IBE problem or a hidden node problem under resource allocation mode2 of V2X communication, avoiding resource collision, and improving reliability of the V2X communication process and a utilization rate of resources.

Eleventh Embodiment

Figure 15:
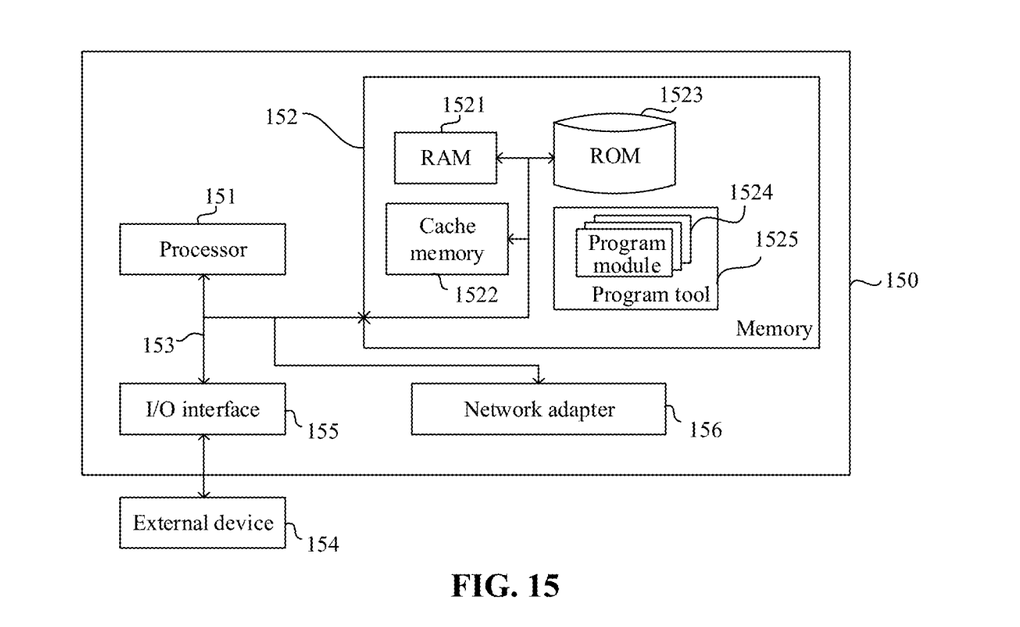
FIG. 15 is a schematic structural diagram of an electronic device according to an eleventh embodiment of the present disclosure.

FIG. 15 is a schematic structural diagram of an electronic device according to the eleventh embodiment of the present disclosure. The electronic device includes a memory, a processor, and a computer program stored on the memory and executable on the processor. The processor, when executing the program, implements the method for processing resource allocation in V2X communication provided in any one of the first and second embodiments, or the method for processing resource allocation in V2X communication provided in any one of the third and fourth embodiments, or the method for processing resource allocation in V2X communication provided in the fifth embodiment. The electronic device 150 shown in FIG. 15 is merely an example, which should not serve as any limitation on the function and application scope of embodiments of the present disclosure.

As shown in FIG. 15, the electronic device 150 may be a general-purpose computing device, such as a server device. Components of the electronic device 150 may include, but are not limited to, at least one processor 151, at least one memory 152, and a bus 153 connecting different system components (including the memory 152 and the processor 151).

The bus 153 includes a data bus, an address bus, and a control bus.

The memory 152 may include a volatile memory, such as a random access memory (RAM) 1521 and/or a cache memory 1522, and may further include a read only memory (ROM) 1523.

The memory 152 may further include a program/practical tool 1525 having a set of program modules 5241 (at least one program module). The program module 1524 includes, but is not limited to, an operation system, one or more application programs, other program modules and program data, and each one or combination of these examples may be used for an implementation of a network environment.

The processor 151 executes the computer program stored in the memory 152, so as to perform various functional applications and data processing, such as the method for processing resource allocation in V2X communication provided in any one of the first and second embodiments, or the method for processing resource allocation in V2X communication provided in any one of the third and fourth embodiments, or the method for processing resource allocation in V2X communication provided in the fifth embodiment.

The electronic device 150 may communicate with at least one external device 154 (such as a keyboard, a pointing device). Such communication may be performed via an input/output (I/O) interface 155. The model-generating device 150 may communicate with one or more networks (for example, a local area network (LAN), a wide area network (WAN), and/or a public network such as the Internet) through a network adapter 156. As shown in FIG. 15, the network adapter 156 communicates with other modules of the model-generating device 150 via the bus 153. It should be understood that, although not shown, other hardware and/or software module may be used in conjunction with the model-generating device 150. The hardware and/or software module includes, but is not limited to microcode, device driver, redundant processor, external disk drive array, redundant arrays of independent disks (RAID) system, tape drive, and data backup storage system.

It should be noted that although mentioned in the above detailed description, the units/modules or sub-units/modules of the electronic device are merely exemplary but not mandatory. According to embodiments of the present disclosure, features and functions of two or more of the units/modules described above may be embodied in one unit/module. Alternatively, features and functions of one of the units/modules described above may be further subdivided to multiple units/modules.

Twelfth Embodiment

A computer-readable storage medium storing a computer program is further provided in an embodiment. The program, when executed by a processor, causes steps of the method for processing resource allocation in V2X communication provided in any one of the first and second embodiments, or the method for processing resource allocation in V2X communication provided in any one of the third and fourth embodiments, or the method for processing resource allocation in V2X communication provided in the fifth embodiment to be implemented.

The readable storage medium may include, but is not limited to, a portable disk, a hard disk, a random access memory, a read-only memory, an erasable programmable read-only memory, an optical storage device, a magnetic storage device, or a combination thereof.

In a possible implementation, the present disclosure may be implemented in a form of a program product including program codes. When the program product is executed on a terminal device, the program codes cause the terminal device to implement steps of the method for processing resource allocation in V2X communication provided in any one of the first and second embodiments, or the method for processing resource allocation in V2X communication provided in any one of the third and fourth embodiments, or the method for processing resource allocation in V2X communication provided in the fifth embodiment.

The program codes for implementing the present disclosure may be written in one programming language or in any combination of more programming languages. The program codes may be fully executed on the user equipment, or partially executed on the user equipment, or executed as a standalone software package, or partially executed on the user equipment and partially executed on a remote device, or fully executed on the remote device.

Although the specific embodiments of the present disclosure are described above, those skilled in the art should understand that the embodiments are merely illustrative, and the protection scope of the present disclosure is defined by the appended claims. Various changes or modifications may be made to the embodiments by those skilled in the art without departing from the principle and essence of the present disclosure, and the changes and modifications shall fall within the protection scope of the present disclosure.

The invention claimed is:

1. A method for processing resource allocation in vehicle-to-everything (V2X) communication, wherein the method for processing resource allocation in V2X communication is applied to a receiver user equipment (UE),
   the method for processing resource allocation in V2X communication comprises:
   determining whether there is a conflict between a reserved resource of an interferer UE and a reserved resource of a sender UE; and
   generating auxiliary information and sending the auxiliary information to the sender UE, in response to determining that there is the conflict, wherein the auxiliary information is used for representing the conflict;
   wherein said determining whether there is the conflict between the reserved resource of the interferer UE and the reserved resource of the sender UE comprises:
       determining whether there is an in-band emission (IBE) problem or a hidden node problem between the reserved resource of the sender UE and the reserved resource of the interferer UE; and
       determining that there is the conflict, in response to determining that there is the IBE problem or the hidden node problem;
   wherein said determining whether there is the IBE problem or the hidden node problem between the reserved resource of the sender UE and the reserved resource of the interferer UE comprises:
       determining whether the reserved resource of the sender UE is adjacent to or the same as the reserved resource of the interferer UE;
       determining whether a reference signal receiving power (RSRP) of the adjacent or the same reserved resource exceeds a preset threshold, in response to the reserved resource of the sender UE being adjacent to or the same as the reserved resource of the interferer UE; and
       determining there is the IBE problem or the hidden node problem, in response to the RSRP of the adjacent or the same reserved resource exceeding the preset threshold;
   wherein the auxiliary information comprises a conflict type, wherein the conflict type is used for representing the IBE problem or the hidden node problem.

2. The method for processing resource allocation in V2X communication according to claim 1, wherein
   the auxiliary information further comprises a priority of transmission data, wherein the transmission data refers to data transmitted by the reserved resource, and the method further comprises:
determining whether a priority of transmission data in the sender UE is lower than or equal to a priority of transmission data in the interferer UE, in response to determining that there is the IBE problem or the hidden node problem between the reserved resource of the sender UE and the reserved resource of the interferer UE; and
determining there is the conflict, in response to the priority of the transmission data in the sender UE being lower than or equal to the priority of the transmission data in the interferer UE.

3. The method for processing resource allocation in V2X communication according to claim 1, wherein the auxiliary information comprises the reserved resource of the interferer UE.

4. The method for processing resource allocation in V2X communication according to claim 3, wherein the auxiliary information further comprises a reservation period of the reserved resource of the interferer UE.

5. The method for processing resource allocation in V2X communication according to claim 1, wherein said sending the auxiliary information to the sender UE comprises:
sending the auxiliary information to the sender UE through sidelink control information (SCI) data.

6. The method for processing resource allocation in V2X communication according to claim 5, wherein
said sending the auxiliary information to the sender UE through SCI data comprises:
generating new SCI data comprising the auxiliary information; and
sending the new SCI data to the sender UE; or
said sending the auxiliary information to the sender UE through SCI data comprises:
adding the auxiliary information into SCI data to form new SCI data;
generating a new radio network temporary identifier based on the auxiliary information;
scrambling the new SCI data by using the new radio network temporary identifier; and
sending the scrambled new SCI data to the sender UE.

7. The method for processing resource allocation in V2X communication according to claim 1, wherein
said sending the auxiliary information to the sender UE comprises:
sending the auxiliary information to the sender UE through a PC5-RRC signaling.

8. A system for processing resource allocation in vehicle-to-everything (V2X) communication, wherein the system for processing resource allocation in V2X communication is applied to a receiver user equipment (UE),
wherein the system for processing resource allocation in V2X communication comprises a processor and a non-transitory memory storing a computer program, wherein the processor, when executing the computer program, is configured to:
determine whether there is a conflict between a reserved resource of an interferer UE and a reserved resource of a sender UE, and
generate auxiliary information and send the auxiliary information to the sender UE in response to determining that there is the conflict, wherein the auxiliary information is used for representing the conflict;
wherein the processor, when executing the computer program, is further configured to:
determine whether there is an in-band emission (IBE) problem or a hidden node problem between the reserved resource of the sender UE and the reserved resource of the interferer UE; and
determine there is the conflict, in response to determining that there is the IBE problem or the hidden node problem;
wherein the processor, when executing the computer program, is further configured to:
determine whether the reserved resource of the sender UE is adjacent to or the same as the reserved resource of the interferer UE;
determine whether a reference signal receiving power (RSRP) of the adjacent or same reserved resource exceeds a preset threshold, in response to the reserved resource of the sender UE being adjacent to or the same as the reserved resource of the interferer UE; and
determine there is the IBE problem or the hidden node problem, in response to the RSRP of the adjacent or the same reserved resource exceeding the preset threshold;
wherein the auxiliary information comprises a conflict type, wherein the conflict type is used for representing the IBE problem or the hidden node problem.

9. The system for processing resource allocation in V2X communication according to claim 8, wherein
the auxiliary information further comprises a priority of transmission data, wherein the transmission data refers to data transmitted by the reserved resource, and
the processor, when executing the computer program, is further configured to:
determine whether a priority of transmission data in the sender UE is lower than or equal to a priority of transmission data in the interferer UE, in response to determining that there is the IBE problem or the hidden node problem between the reserved resource of the sender UE and the reserved resource of the interferer UE, and
determine there is the conflict, in response to the priority of the transmission data in the sender UE being lower than or equal to the priority of the transmission data in the interferer UE.

10. The system for processing resource allocation in V2X communication according to claim 8, wherein the auxiliary information comprises the reserved resource of the interferer UE.

11. The system for processing resource allocation in V2X communication according to claim 10, wherein the auxiliary information further comprises a reservation period of the reserved resource of the interferer UE.

12. The system for processing resource allocation in V2X communication according to claim 8, wherein the processor, when executing the computer program, is further configured to send the auxiliary information to the sender UE through sidelink control information (SCI) data.

13. The system for processing resource allocation in V2X communication according to claim 12, wherein
the processor, when executing the computer program, is further configured to:
generate new SCI data comprising the auxiliary information; and
send the new SCI data to the sender UE; or
the processor, when executing the computer program, is further configured to:
add the auxiliary information into SCI data to form new SCI data;
generate a new radio network temporary identifier based on the auxiliary information;

scramble the new SCI data by using the new radio network temporary identifier; and send the scrambled new SCI data to the sender UE.

14. A non-transitory computer-readable storage medium storing a computer program, wherein the computer program, when being executed by a processor, causes the processor to:

determine whether there is a conflict between a reserved resource of an interferer user equipment (UE) and a reserved resource of a sender UE; and generating auxiliary information and sending the auxiliary information to the sender UE, in response to determining that there is the conflict, wherein the auxiliary information is used for representing the conflict;

wherein the computer program, when being executed by the processor, further causes the processor to:

determine whether there is an in-band emission (IBE) problem or a hidden node problem between the reserved resource of the sender UE and the reserved resource of the interferer UE; and determine there is the conflict, in response to determining that there is the IBE problem or the hidden node problem;

wherein the computer program, when being executed by the processor, further causes the processor to:

determine whether the reserved resource of the sender UE is adjacent to or the same as the reserved resource of the interferer UE;

determine whether a reference signal receiving power (RSRP) of the adjacent or same reserved resource exceeds a preset threshold, in response to the reserved resource of the sender UE being adjacent to or the same as the reserved resource of the interferer UE; and determine there is the IBE problem or the hidden node problem, in response to the RSRP of the adjacent or the same reserved resource exceeding the preset threshold;

wherein the auxiliary information comprises a conflict type, wherein the conflict type is used for representing the IBE problem or the hidden node problem.

* * * * *